United States Patent Office 3,787,381
Patented Jan. 22, 1974

3,787,381
PROCESS FOR THE POLYMERIZATION WITH RING OPENING OF CYCLOPENTENE
Wolfgang Oberkirch, Cologne-Stammheim, Peter Gunther, Opladen, and Gottfried Pampus, Leverkusen, Germany, assignors to Farbenfabriken Bayer Aktiengesellschaft, Leverkusen, Germany
No Drawing. Continuation of abandoned application Ser. No. 877,007, Nov. 14, 1969. This application Aug. 4, 1971, Ser. No. 169,123
Int. Cl. C08f 1/56
U.S. Cl. 260—87.5 C                    5 Claims

ABSTRACT OF THE DISCLOSURE

Catalyst combination for polymerizing cyclopentene comprising (a) a compound of a metal of the 5th or 6th Group of the Periodic System,
(b) an organic aluminum compound,
(c) an aliphatic or aromatic hydrocarbon which contains one or more carbon-carbon double bonds and which is substituted with halogen or at least one carbon atom of a double bond, and a polymerization process using this catalyst.

CROSS REFERENCE TO RELATED APPLICATION

This application is a continuation of Ser. No. 877,007 filed Nov. 14, 1969 and now abandoned.

It is known that cyclopentene can be polymerized with ring opening to form linear unsaturated hydrocarbons by means of organometallic mixed catalysts of niobium, tantalum, molybdenum and tungsten salts and organic aluminum compounds. These processes provide good yields only when carried out in the absence of solvents. Polymerization in bulk, however, cannot be carried out on an industrial scale because the very viscous reaction mixtures give rise to insuperable difficulties in working up. Moreover, products which are obtained in this way are largely cross-linked and are therefore technically useless.

The use of cocatalyst compounds which contain an oxygen-oxygen or an oxygen-hydrogen bond together with certain organometal catalysts is also known. Polymerization is then also preferably carried out in the absence of solvents and provides only low yields. All the known processes, furthermore, require the use of a very large amount of catalyst.

A process for the polymerization of cyclopentene with ring opening using metal compounds of the 5th and 6th sub-group of the Periodic System and organic aluminum compounds as catalysts has now been found in which process aliphatic or aromatic hydrocarbons which contain one or more carbon-carbon double bonds and which are substituted with halogen on at least one carbon atom of a double bond are used as cocatalysts.

These compounds will hereinafter be designated as "hydrocarbons substituted with halogen on the double bond." Halogens within the meaning of the invention are understood to be fluorine, chlorine, bromine and iodine. The hydrocarbons may be either olefinically unsaturated aliphatic hydrocarbons, preferably alkenes containing 2 to 12 carbon atoms, or aromatic hydrocarbons, preferably benzene, naphthalene or diphenyl.

The process according to the invention provides an important technical advance over the prior art in that it is now possible to obtain very high yields even with catalyst amounts corresponding to 0.2 to 4 mmol of metal of the 5th or 6th sub group of the Periodic Table per 100 g. of monomers.

The following are examples of hydrocarbons which are substituted with halogen at the double bond in accordance with the invention: vinyl halides such as vinyl chloride or vinyl bromide, 1,1 - dichloroethylene, 1,2 - dichloroethylene, trichloroethylene, tetrachloroethylene, chloroprene, hexachlorocyclopentadiene and aryl halides such as chloro-, bromo- and iodo-benzenes, dichlorobenzene, trichlorobenzene, hexachlorobenzene or 2-chloronaphthalene.

Catalytically active transition metal compounds of the 5th and 6th sub-group are, for example, the halides of molybdenum, tungsten and tantalum, preferably the chlorides of these metals such as $MoCl_5$, $WCl_6$, $WBr_5$, $WOCl_4$, $TaBr_5$ and $TaCl_5$.

Suitable organic aluminum compounds are, for example, aluminum trialkyls such as $(C_2H_5)_3Al$, $$(i\text{-}C_4H_9)_3Al$$

aluminum haloalkyls such as $(C_2H_5)_2AlCl$, $$(C_2H_5)_3Al_2Cl_3$$

and $(C_2H_5)AlBr_2$ and alkoxyaluminum alkyls such as $(C_2H_5)_2AlOC_2H_5$.

According to the new process, the catalyst components may be used in the following molar ratios:

Transition metal compound:halogen compound:aluminum compound=1:0.1 to 100:0.8 to 15.

0.1 to 8 mmol, preferably 0.2 to 4 mmol of transition metal compound are used per 100 g. of monomer.

The solvents used for the process may be aliphatic hydrocarbons such as butane, pentane, hexane or isooctane or cycloaliphatic hydrocarbons such as cyclohexane, or aromatic hydrocarbons such as benzene, toluene, or xylene or halogenated hydrocarbons such as chloroform or chlorobenzene. 5 to 50% solutions of cyclopentene in these solvents may be used in the process. Monomer concentrations of 10 to 30% are preferably employed.

The temperature during the preparation of the catalyst may be −60° C. to +60° C.

In a preferred embodiment of the process, the transition metal compound is first added to the monomer solution, followed by the cocatalyst and then the organic aluminum compound is added last.

After the addition of the organic aluminum compound, polymerization starts immediately. The polymerization temperature may be −80° C. to +60° C. and is preferably −40° C. to +30° C. The polymerization time is usually 1 to 5 hours. High conversions of cyclopentene to give practically gel-free polypentenamer are then obtained.

By a suitable choice of the catalyst components and catalyst composition (molar ratio and sequence of adding components), the molecular weight of the polymers can be adjusted to any desired value within wide limits. The viscosity may be adjusted to viscosity number ($\eta$) of 0.8 to 6.0 dl./g. (at 25° C. in toluene).

The polymers which are obtained according to the invention are valuable rubber-like elastomers. The double bond content and to a large extent the ratio of the cis- to trans-double bonds may be adjusted by suitable choice of the catalyst composition.

When the desired conversion has been reached, polymerization is stopped by the addition of alcohols, carboxylic acids and/or amines. One of the conventional products, such as phenyl-$\beta$-naphthylamine, 2,6-di-tertiary butyl-4-methylphenol or 2,2'-dihydroxy-3,3'-ditertiary butyl-5,5'-dimethyldiphenylmethane is then added to the polymer solution in quantities of 0.2 to 3% as stabilizer and age-resistor.

The polymer may be isolated by known methods, e.g. by precipitation with an alcohol.

EXAMPLES 1 TO 5

200 mg. of tungsten hexachloride are dissolved in 100 ml. of toluene with the exclusion of air and moisture and 30 g. of cyclopentene are added followed by hexachlorocyclopentadiene in the amount specified in Table I. The reaction mixture is cooled to —5° C. and 50 mg. of triisobutyl aluminum are then added. After a polymerization time of 4 hours, the product is precipitated with alcohol, washed again with alcohol and dried in a vacuum drying cupboard at 50° C.

TABLE I

| | Molar ratio $WCl_6$/hexachloro-cyclopentadiene | Yield, percent |
|---|---|---|
| Example: | | |
| 1 | 1:0.5 | 37 |
| 2 | 1:2.0 | 59 |
| 3 | 1:5.0 | 43 |
| 4 | 1:20.0 | 37 |
| 5 | (1) | 3 |

1 Without additives.

The double bond content of the products prepared in this way is above 90%. Intrinsic viscosities (measured in toluene at 20° C.) of between 3.0 and 6.0 are obtained.

EXAMPLES 6 TO 9

30 g. of cyclopentene which has been mixed with 500 p.p.m. of butene-1 are added to a solution of 200 mg. of tungsten hexachloride in 100 ml. of toluene. The halogen compounds indicated in the table is then added. The solution is cooled to —8° C. and reduced with 62 mg. of triisobutyl aluminum.

After a polymerization time of 4 hours, the product is worked up as in Examples 1 to 5.

TABLE II

| | Halogen compound | In percent based on cyclopentene | Yield, percent |
|---|---|---|---|
| Example: | | | |
| 6 | 2-chlorobutadiene | 2.0 | 57 |
| 7 | do | 6.0 | 74 |
| 8 | Vinylidene chloride | 0.3 | 23 |
| 9 | do | 3.0 | 37 |

The products of Examples 7 and 9 are no longer completely soluble in toluene after drying.

EXAMPLE 10

400 mg. of tungsten hexachloride are dissolved in 200 ml. of toluene, and 0.4 g. of vinyl chloride is added. 50 g. of cyclopentene are added to the mixture. Reduction is then carried out at —5° C. with 1.5 ml. of a 1 molar solution of triisobutyl aluminum in toluene. After 2 hours, polymerization at — 5° C. the yield is 78% ($\eta$)=3.27 (measured in toluene at 25° C.). Trans-double bond content (according to IR spectrum)=90.2%.

EXAMPLE 11

Proceeding in the same way as in Example 10 but using 1 g. of 1,2-dichloroethylene instead of vinyl chloride, the yield is 23% and the trans-double bond content only 74%.

EXAMPLES 12 TO 20

The halogen compound indicated in the table and then 50 g. of cyclopentene which also contains 550 p.p.m. of butene-1 are added to a solution of 360 mg. of tantalum pentachloride in 200 ml. of toluene. After cooling to —40° C., 2.4 ml. of 50% solution of ethyl aluminum dichloride in hexane are added. After 4 hours' polymerization at —30 to —40° C., the product is worked up as given in Examples 1 to 5.

TABLE III

| | Halogen compound | In percent based on cyclopentene | Yield, percent |
|---|---|---|---|
| Example: | | | |
| 12 | Vinyl chloride | 2 | 50 |
| 13 | 1,2-dichloroethylene | 4 | 48 |
| 14 | Trichloroethylene | 4 | 25 |
| 15 | Tetrachloroethylene | 4 | 25 |
| 16 | Chlorobenzene | 4 | 25 |
| 17 | Bromobenzene | 4 | 40 |
| 18 | 1,2-dichlorobenzene | 4 | 39 |
| 19 | 1,4-dichlorobenzene | 4 | 37 |
| 20 | Without additive | | 15 |

EXAMPLE 21

710 mg. of tantalum-(V) chloride are dissolved or suspended in 250 ml. of anhydrous toluene, and 50 g. of cyclopentene which contains 1% by weight of vinylidene chloride are added. After the reaction mixture has been cooled to —20° C., 1.55 of ethyl aluminum dichloride is added and the temperature is kept at —20° C. for 5 hours. Polymerization is then stopped with a solution of 4 ml. of tri-n-butylamine in 100 ml. of toluene and the product is worked up as in Examples 1 to 5. A rubber-like polymer is obtained in a yield of 52%.

EXAMPLE 22

If the amount of vinyidene chloride added is increased to 4% by weight and the process is otherwise carried out as in Example 21, the conversion is increased to 82%.

We claim:
1. A process for polymerizing cyclopentene, with ring opening, said process comprising contacting, in a first step, cyclopentene, an organic solvent for said cyclopentene and (a) a molybdenum, tungsten or tantalum halide, said first step being carried out by either combining said metal halide and said solvent and then adding said cyclopentene or by combining said cyclopentene and said solvent and then adding said metal halide, then adding, in a second step, to resulting mixture (b) a member of the group consisting of alkenes having 2 to 12 carbon atoms, benzene, napthalene and diphenyl, each having halogen as a substituent of at least one carbon atom attached to a double bond, then contacting resulting mixture, in a third step, with (c) aluminum trialkyl, aluminum haloalkyl or alkoxy aluminum alkyl at a temperature of from —80 to 60° C. and recovering resulting polymer, the molar ratio of (a):(b):(c) being from 1:0.1 to 100:0.8 to 15 and the amount of (a) being from 0.1 to 8 mmol per 100 g. of cyclopentene.

2. The process of claim 1 wherein there is 0.2–4 mmols of (a) per 100 g. of cyclopentene.

3. The process of claim 1 wherein said temperature is from —40 to 30° C.

4. The process of claim 1 wherein (b) is vinyl chloride.

5. The process of claim 1 wherein (b) is vinylidene chloride.

References Cited
UNITED STATES PATENTS

| 3,380,981 | 4/1968 | Miller et al. | 260—93.7 |
| 3,432,513 | 3/1969 | Miller et al. | 260—93.7 |
| 3,458,489 | 7/1969 | Natta et al. | 260—93.1 |
| 3,492,278 | 1/1970 | Uranek et al. | 260—93.1 |

STANFORD M. LEVIN, Primary Examiner

U.S. Cl. X.R.

260—33.6 PQ, 82.1, 87.7, 93.1